United States Patent [19]
Tedstone et al.

[11] 3,952,972
[45] Apr. 27, 1976

[54] INERTIAL SEPARATOR

[75] Inventors: Donald Tedstone, St. Lambert; Hans-Herman Schaüm; John James Sanderson, both of St. Bruno, all of Canada

[73] Assignee: United Aircraft of Canada Limited, Longueuil, Canada

[22] Filed: Dec. 24, 1974

[21] Appl. No.: 536,155

[52] U.S. Cl............................ 244/53 B; 60/39.09 P
[51] Int. Cl.²......................................... B64D 33/02
[58] Field of Search .................... 244/134 R, 53 B; 60/39.09 D, 39.09 P; 55/306

[56]  References Cited
UNITED STATES PATENTS

| | | |
|---|---|---|
| 3,148,043 | 9/1964 | Richardson et al. ........ 60/39.09 P X |
| 3,329,377 | 7/1967 | Peterson et al. .................. 244/53 B |
| 3,513,641 | 5/1970 | Hooper et al. ..................... 244/53 B |
| 3,765,179 | 10/1973 | Strang et al. .................. 244/53 B X |
| 3,766,719 | 10/1973 | McAnally...................... 244/53 B X |

FOREIGN PATENTS OR APPLICATIONS

| | | |
|---|---|---|
| 1,936,061 | 4/1971 | Germany.......................... 244/134 R |
| 112,896 | 4/1941 | Australia......................... 244/134 R |

*Primary Examiner*—Trygve M. Blix
*Assistant Examiner*—Galen L. Barefoot
*Attorney, Agent, or Firm*—Alan Swabey; Robert Mitchell; Melvin Sher

[57] ABSTRACT

The invention relates to an improvement to an installation for preventing the ingress of super-cooled water, ice, snow and other debris as taught in U.S. Pat. No. 3,329,377. In the patent, an inertial separator effect is used to prevent ingress of super cooled water, ice, snow and other debris to an aircraft engine. The effect is obtained by an installation including a duct formed in a sub-nacelle of the engine to extend generally longitudinally of the engine. An air deflecting surface in the duct confines the incoming air to a passage of reduced cross section, and an opening in the duct wall downstream of the deflecting surface is formed between the trailing edge of the deflecting surface and the leading edge of a rearward portion of the duct, the opening in the duct wall communicating with the engine air intake. In accordance with the present invention, any or all of the following improvements are made to the above installation:

a. a cyclic ice shedder is provided to extend inwardly from the leading edge of the rearward portion;

b. the rearward portion is formed in the shape of a hopper which is spaced from the outlet passage;

c. a fairing is provided at the trailing edge of the deflecting surface; and d. a lower surface of the duct is contoured between the trailing edge of the deflecting surface and the discharge opening of the duct to provide a fairing between the cross sectional area of the duct at the trailing edge of the deflecting surface and the cross sectional area at the discharge opening.

8 Claims, 4 Drawing Figures

INERTIAL SEPARATOR

BACKGROUND OF THE INVENTION

1. Field of the Invention

The invention relates to an improvement to an installation for preventing the ingress of super-cooled water, ice, snow and other debris to the air intake of an aircraft engine. More specifically, this invention is an improvement of the installation taught in U.S. Pat. No. 3,329,377, Peterson et al, issued July 4, 1967, and assigned to the assignee of the instant application. The disclosure of the above-mentioned United States Patent is incorporated herein by reference.

2. Statement of the Prior Art

In the above-mentioned patent, an inertial separator effect is used to prevent ingress of super cooled water, ice, snow and other debris to an aircraft engine. In accordance with the patent the effect is obtained by an installation including a duct formed in a sub-nacelle of the engine to extend generally longitudinally of the engine, an air deflecting surface in the duct to confine the incoming air to a passage of reduced cross section, and an opening in the duct wall downstream of the deflecting surface, the opening being formed between the trailing edge of the deflecting surface and the leading edge of a rearward portion of the duct.

Although the above-described installation provides reasonable performance, it does so with the penalty of a pressure loss due to the effect of the deflecting surface. Although some pressure loss must be experienced within an installation of this nature, it is one of the objects of the present invention to minimize the pressure loss by modifications and additions to the installation structure.

In addition, because of the shape and structure of the rearward portion, ice can form on the leading edge thereof to restrict the opening in the duct wall and lead to system deterioration with time. The ice forming on the rearward portion will also extend downwardly from the rearward portion to restrict the discharge outlet. It is a further object of the invention to modify the structure of the rearward portion to substantially reduce these effects.

SUMMARY OF THE INVENTION

The invention provides, for an aircraft engine comprising an encasing nacelle and provided with an air intake and an installation for reducing ingress of super-cooled water, ice, snow and other debris to said air intake, the installation comprising a duct extending generally longitudinally of the engine, an open inlet at the forward end of the duct and an outlet, spaced from the inlet in the downstream direction of the duct. One of the walls of the duct is co-incident with a portion of the nacelle. An air deflecting surface in the duct extends rearwardly from the portion of the nacelle and in a direction away from the portion of the nacelle, the air deflecting surface extending over a part of the cross-section of the duct so as to confine incoming air to a passage of reduced cross-section. An opening is provided in the portion of the nacelle downstream of the deflecting surface and is formed between the trailing edge of the deflecting surface and the leading edge of a rearward part of the portion of the nacelle, the opening communicating with the air intake so that air passing to the intake is deflected through a substantial angle around the deflecting surface whereas remaining air together with material of greater inertia passes without deflection to the opening through an outlet passage. One surface of the outlet passage is formed by the rearward part of the portion of the nacelle. The invention comprises the improvement comprising cyclic ice shedder means extending outwardly from at right angles to the leading edge of the rearward part of the portion of the nacelle.

To prevent ice from forming in the discharge outlet on a surface of the outlet passage, the rearward part of the portion of the nacelle comprises a hopper section at the forward end thereof, the hopper section being spaced from the one surface of the outlet passage.

One of the surfaces of the hopper section may comprise a screened portion.

To reduce pressure losses, a fairing is provided at the trailing edge of the deflecting surface. Preferably, the fairing comprises an extension of the deflecting surface bent through a smooth curve to extend in the direction of the air chamber.

To further prevent pressure losses, the lower surface of the duct is contoured between the trailing edge of the deflecting surface and the discharge opening to provide a fairing between the cross-sectional area of the duct at the trailing edge of the deflecting surface and the cross-sectional area at the discharge opening. Preferably, the contour at the lower surface of the duct is hill-shaped in cross-section.

BRIEF DESCRIPTION OF THE DRAWINGS

The invention will be better understood by a consideration of the following disclosure together with the accompanying drawings in which.

Like references indicate like parts in all figures.

DETAILED DESCRIPTION OF THE DRAWINGS

Figure 1:
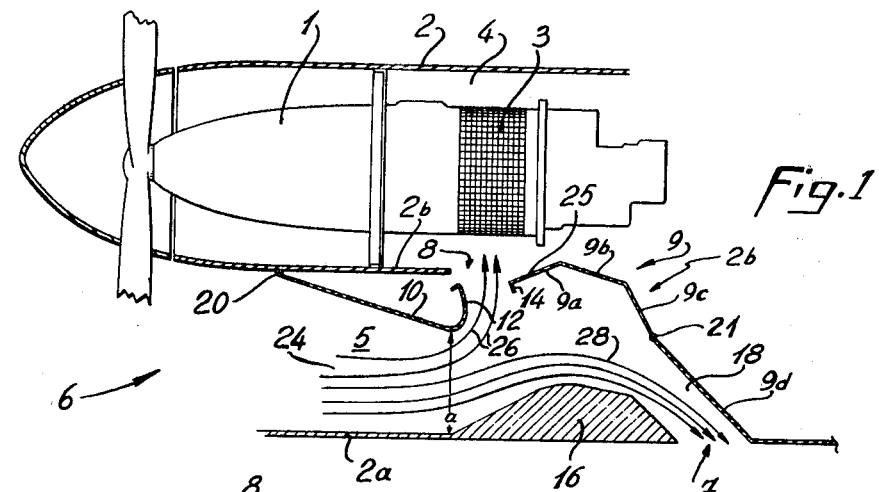
FIG. 1 is a side section of an installation in accordance with the invention.

Referring to FIG. 1, an aircraft engine 1 is enclosed in encasing nacelle 2 and includes an air intake 3 disposed in annular plenum or air chamber 4. An air duct 5 is formed of sub-nacelle 2a and a portion 2b of the nacelle. The air duct includes a forwardly directed air inlet 6 and an outlet 7, spaced from the inlet in the downstream direction of the duct.

Although the air duct 5 is shown formed in sub-nacelle 2a, it will be appreciated that the duct could be formed at any circumferential position of the nacelle. Without restricting the generality of the foregoing, it is pointed out that air ducts for helicopter engines could be mounted on a side of the nacelle. However, in the following description, and to illustrate the invention, the duct is shown formed in the sub-nacelle.

A duct opening 8 is provided in the portion 2b of the nacelle to communicate with air intake 3 between the trailing edge of air deflecting surface 10 and the leading edge of the rearward part 9 of the portion 2b of the nacelle. The air deflecting surface 10 includes a fairing 12 at the trailing edge thereof, and the leading edge of the rearward part of the portion 2b of the nacelle includes a cyclic ice shedder 14 extending at right angles and outwardly therefrom. The fairing 12 can comprise an extension of the surface 10 bent through a smooth curve to extend in the direction of the air chamber. The cyclic ice shedder is preferably a thin sheet of metal chosen to oscillate under aerodynamic load. The deflecting surface provides an area a of reduced cross-section in the duct at the trailing edge of the deflecting surface.

The part 9 comprises a hopper means formed in sections 9a to 9c, in a series of straight line segments although, as will become clear below, more or lesser straight line segments can be used to form the hopper means, or the hopper means can be formed in a smooth curve. The segment 9a can comprise a screened portion 25. Straight surface 9d extends from the hopper means to air outlet opening 7, and contoured surface 16 extends from the trailing edge of the deflecting surface 10 to the outlet opening 7. The contoured surface is hill-shaped in cross-section. A part of the surface 16 together with the surface 9d define outlet passage 18 which communicates with the outlet opening 7. As is apparent, the hopper means is spaced inwardly from the straight surface 9d.

Hinge means 20 and 21 are provided at the upstream edge of deflecting surface 10 and the downstream edge of the hopper means respectively for purposes to be described below.

As in the above-identified patent, the purpose of the deflecting surface 10 is to divide the incoming airstream 24 into two airstreams 26 and 28. The airstream 28 passes in a substantially unimpeded path through the passage of reduced cross-section a, over the contoured surface 16 and through the outlet opening 7. As it passes under the trailing edge of 10, it is compressed and accelerated so that the area at a presents an area of high velocity air. Particles of debris such as snow and frozen water particles have a higher inertia than the carrier airstream so that these particles will follow the unimpeded path to the outlet 7.

The plenum 4 presents an area of lower pressure so that a part 26 of the incoming airstream 24 will be drawn into the plenum through the opening 8. The stream 26 will have been forced to make a sharp inward turn at the trailing edge of the surface 10, so that only a relatively insignificant proportion of the high inertia particles will be able to flow in the stream 26. Thus, particles of debris will be prevented from entering the plenum 4 and the air intake 3.

Because of the small cross-sectional area in the opening 8, the velocity of the airstream in the opening 8 will be relatively high. In the same way, the velocity of the airstream in the outlet 7 will be relatively high.

It will now be seen that the following modifications have been made to the installation of the above-identified patent:

a. A cyclic ice shedder 14 extends outwardly from and at right angles to the leading edge of the rearward part 9 of the portion 2b of the nacelle;

b. A portion of the surface 9 has been formed in the shape of a hopper which is spaced from the section 9d to be out of the path of the outlet passage 18;

c. A fairing surface 12 has been added to the trailing edge of the deflecting surface 10; and d. The bottom surface of the duct has been contoured at 16.

It will of course be appreciated that any one of these modifications will provide improved performance relative to the performance of the patented installation, and that combinations of the modifications will provide greater improvements than the individual modifications of the combinations. For the most efficient and reliable performance, all of the modifications are implemented.

Figure 2:
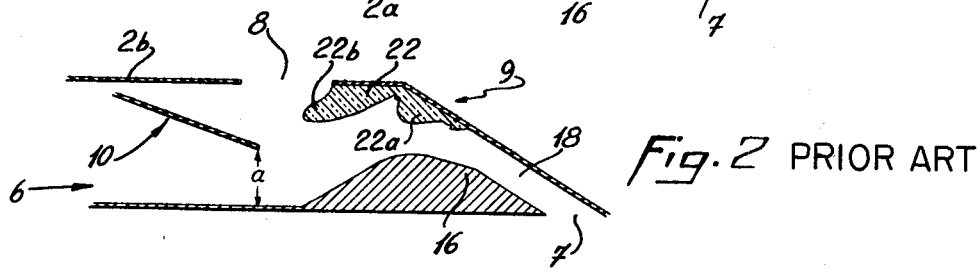
FIG. 2 illustrates the problems in previous installations.
Figure 3:
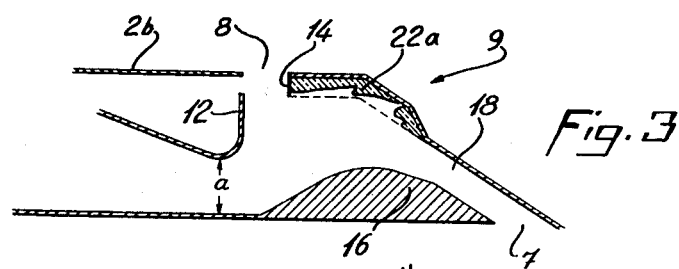
FIG. 3 shows how the inventive installation overcomes the problems.

In order to understand how the modifications provide improved performance, reference is made to FIGS. 2 and 3.

Considering first the need for the shedder 14, as seen in FIG. 2, ice formation 22b will build up to extend across the opening 8. This will have the effect of restricting air flow into the plenum 4 which will result in continuously increasing pressure losses with time. In addition, after a time the build up 22b will break off and be sucked into the air chamber to possibly damage the engine.

With the cyclic ice shedder, and due to the oscillatory action thereof, ice which builds up on the shedder will be shed in small harmless pieces over regular intervals. Although the small pieces may be drawn into the engine, they are small enough to be harmless so that they do not incur any difficulties. In addition, the opening 8 is kept clear.

Considering now the requirement for the hopper means, as can be seen in FIG. 2, due to the fact that some supercooled water and particles of ice are drawn towards and make contact with the under surface of 9, a formation of ice such as 22a will build up on the underside of 9. The ice formation 22a will tend to block the outlet passage 18 and thereby reduce the airflow out through the passage to reduce the separator's effectiveness with time. By providing a hopper section as in FIG. 3, and by spacing the hopper section out of the line of the outlet passage, this effect is avoided. As is clear, the particular shape of the hopper is not critical. Rather, it is the depth of the hopper which is important, and the depth required is a function of the amount of ice which can normally be expected to build up. This last variable is a function of aircraft type and prospective missions, and is therefore a known factor in specific cases. The hopper is built deep enough so that, with maximum ice build up, the ice will not extend into the outlet passage 18.

As was mentioned above, the airstream in the area a will be flowing at a relatively high velocity as will the airstream in the opening 8. However, as the airstream passes around the trailing edge of deflecting surface 10, as it is forced through a sharp angle, the velocity of the air between a and 8 suffers an abrupt transition leading to pressure losses. To reduce the abruptness of the change in direction of the airstream, the fairing 12 is added to the deflecting surface. The smooth curve between the deflecting surface and the fairing permits a smoother transition.

Tests showed that, with an uncontoured surface at the bottom of the duct, a large stalled zone existed under the hopper on the bottom of the duct. This resulted in increased pressure losses. In addition, supercooled water and snow was trapped in this zone to be subsequently sucked into the plenum. By contouring the bottom surface, to thereby provide a fairing between the area of reduced cross-section a and the outlet 7, the stall zone is suppressed. Again, a relatively smooth contoured surface must be provided.

The dimensions defining spacings between elements in the installation are, of course, a function of the aircraft, the engine size, and the duct size. However, some of the dimensions should be scaled so as to be proportionally consistent in different size ducts. Conveniently, the dimensions are normalized relative to the dimension H, the distance from the surface of the sub-nacelle 2a to the bottom of the deflecting surface 10. H is applicable under icing conditions. The significant dimensions, normalized to H, are illustrated in FIG. 4 hereof.

Figure 4:
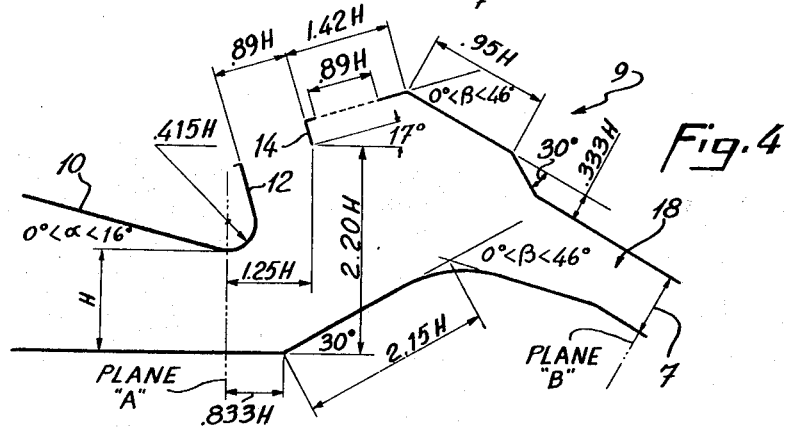
FIG. 4 illustrates relative dimensions of the installation.

In order to design an inertial separator with the normalized dimensions of FIG. 4, it is necessary, of course, to obtain an initial value. In obtaining the initial value, several parameters must be considered.

The parameter "BPR" (by-pass ratio) is the ratio of that part of the air stream which is discharged to the atmosphere through the discharge outlet 7 to that part of the airstream deflected into the plenum through the opening 8. The ratio should be maintained at 35% plus or minus 5%.

In addition, in any rectangular duct flow problem involving bend, the dimension in the plane of the bend will dominate providing that the distance between side walls is great enough. The distance between side walls is, of course, the width W of the duct, and the width of the duct is in a plane at right angles to the plane illustrated in the drawings hereof. However, there exists a lower limit of duct width beyond which side wall effects will have an increasingly important effect. This effect is a function of duct aspect ratio which is the ratio of the duct width to height, i.e., Aspect Ratio is equal to $W/H$. Tests on the inertial separator have shown that side wall effects are negligible at Aspect Ratios greater than 4.1, so that it has been concluded that scaling of the inertial separator is possible providing that the Aspect Ratio is kept greater than 4.1.

To design an inertial separator in accordance with the relative dimensions illustrated in FIG. 4, the designer would pursue the following steps:

1. The flow of air required by the plenum would first be determined. This is of course a function of the type and size of aircraft engine.
2. The total air flow at plane A of FIG. 4, to insure a BPR of 35% plus or minus 5%, is then determined.
3. Using the information obtained in 2 above, the dimensions W and H are selected such that W/H is greater than or equal to 4.1. This relationship, together with the total air flow at the inlet, will provide sufficient inertia to the particles to insure their separation.
4. Having thus determined the dimension H, the separator is laid out using the normalized dimensions as illustrated in FIG. 4.
5. A location for the plane B of FIG. 4 is selected and an area size is selected to insure that the discharged air is in proper proportion of the plenum air.
6. A layout of the separator is completed by chosing an angle $\beta$ to accomodate the plane B.
7. The dimension of the shedder 14 is selected to suit the application of the separator. In FIG. 4 a dimension of 0.333H is used. However, this refers only to a specific embodiment.

Although several embodiments have been described and discussed above, this was for the purpose of illustrating, but not limiting, the invention. Various modifications, which will come readily to the mind of one skilled in the art, are within the scope of the invention as defined in the appended claims.

We claim:

1. For an aircraft engine comprising an encasing nacelle and provided with an air intake and an installation for reducing ingress of super-cooled water, ice, snow and other debris to said air intake, said installation comprising a duct extending generally longitudinally of said engine, an open inlet at the forward end of said duct and an outlet, spaced from said inlet in the downstream direction of said duct, one of the walls of said duct being co-incident with a portion of said nacelle, an air deflecting surface in said duct extending rearwardly from said portion of said nacelle and in a direction away from said portion of said nacelle, the air deflecting surface extending over a part of the cross-section of said duct so as to confine incoming air to a passage of reduced cross-section, an opening in said portion of said nacelle downstream of the deflecting surface and formed between the trailing edge of the deflecting surface and the leading edge of a rearward part of said portion of said nacelle, said opening communicating with said air intake whereby air passing to said intake is deflected through a substantial angle around said deflecting surface whereas remaining air together with material of greater inertia passes without deflection to said opening through an outlet passage, one surface of said outlet passage being formed by said rearward part of said portion of said nacelle, the improvement comprising cyclic ice shedder means extending outwardly from and at right angles to said leading edge of said rearward part of said portion of said nacelle.

2. An installation as defined in claim 1 wherein said rearward part of said portion of said nacelle comprises a hopper section at the forward end thereof, said hopper section being spaced from said one surface of said outlet passage.

3. An installation as defined in claim 2 wherein one of the surfaces of said hopper section comprises a screened portion.

4. An installation as defined in claim 1 and further comprising a fairing at the trailing edge of said deflecting surface.

5. An installation as defined in claim 4 wherein said fairing comprises an extension of said deflecting surface bent through a smooth curve to extend in the direction of said nacelle.

6. An installation as defined in claim 1 wherein the lower surface of said duct is contoured between the trailing edge of said deflecting surface and the discharge opening to provide a fairing between the cross sectional area of the duct at the trailing edge of the deflecting surface and the cross-sectional area at the discharge opening.

7. An installation as defined in claim 6 wherein the contour at the lower surface of the duct is hill-shaped in cross-section.

8. For an aircraft engine comprising an encasing nacelle and provided with an air intake and an installation for reducing ingress of super-cooled water, ice, snow and other debris to said air intake, said installation comprising a duct extending generally longitudinally of said engine, an open inlet at the forward end of said duct and an outlet, spaced from said inlet in the downstream direction of said duct, one of the walls of said duct being co-incident with a portion of said nacelle, an air deflecting surface in said duct extending rearwardly from said portion of said nacelle and in a direction away from said portion of said nacelle, the air deflecting surface extending over a part of the cross-section of said duct so as to confine incoming air to a passage of reduced cross-section, said deflecting surface comprising a fairing at the trailing edge thereof, said fairing comprising an extension of said deflecting surface bent through a smooth curve to extend in the direction of said nacelle, an opening in said portion of said nacelle downstream of the deflecting surface and formed between the trailing edge of the deflecting surface and the leading edge of a rearward part of said portion of said nacelle, said opening communicating with said air intake whereby air passing to said intake is deflected through a substantial angle around said deflecting surface whereas remaining air together with material of greater inertia passes without deflection to said opening through an outlet passage, one surface of said outlet passage being formed by said rearward part of said portion of said nacelle, cyclic ice shedder means extending outwardly from and at right angles to said leading edge of said rearward part of said portion of said nacelle, said rearward part of said portion of said nacelle comprising a hopper section at the forward end thereof, said hopper section being spaced from said one surface of said outlet passage, wherein the lower surface of said duct is contoured between the trailing edge of said deflecting surface and the discharge opening to provide a fairing between the cross-sectional area of the duct at the trailing edge of the deflecting surface and the cross-sectional area at the discharge opening.

* * * * *